United States Patent Office 3,404,227
Patented Oct. 1, 1968

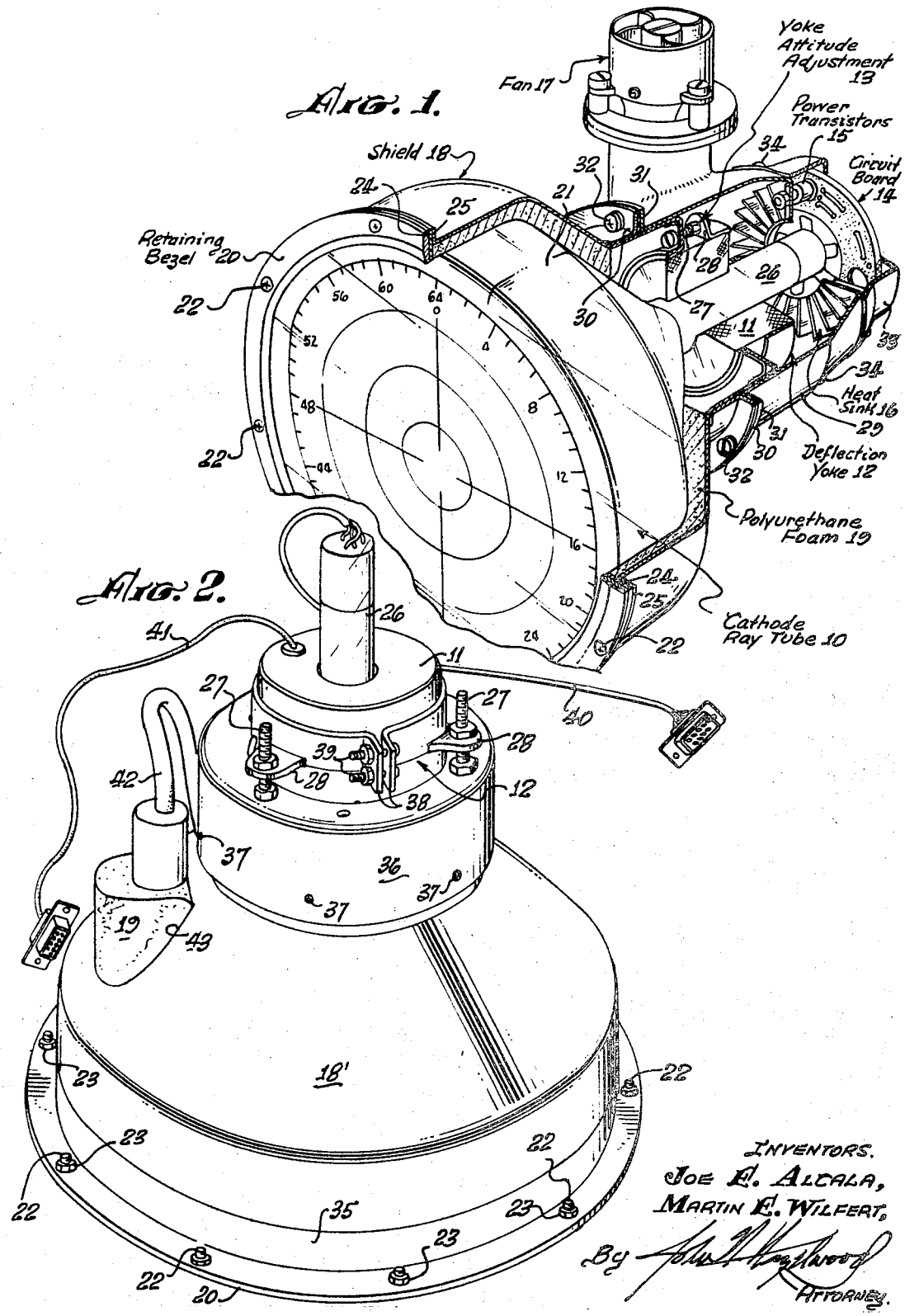

3,404,227
CATHODE RAY TUBE PACKAGE
Joe E. Alcala, Pomona, and Martin E. Wilfert, Glendora, Calif., assignors to General Dynamics Corporation (Pomona Division), Pomona, Calif., a corporation of Delaware
Filed Aug. 17, 1965, Ser. No. 480,278
6 Claims. (Cl. 178—7.8)

ABSTRACT OF THE DISCLOSURE

A self-contained cathode ray tube display package having a mounting and supporting means incorporating some of the final electronic drive stages for the cathode ray tube and including means permitting the tube to withstand severe shock and vibration.

Shock and vibration environment has been a problem in the effective utilization of cathode ray tubes. Due to this type of environment much effort has been directed to mounting methods and apparatus for cathode ray tubes (CRT). While satisfactory mounts have been developed to protect the tube, these prior known mounts have caused limitations in various areas of the most effective operation of the CRT.

One of the primary problems solved by this invention is the provision of a vibration and shock mounting which allows for the wide dimensional tolerance structure inherent in the fabrication of the cathode ray tube.

The CRT mounting of this invention is incorporated in an assembly for illustration purposes as a complete display package. The package is self-contained and has only two electrical interfaces with the rest of the system. The complete assembly provides a replaceable part which is subject to further repair and replacement of its subassemblies and components.

Therefore, it is an object of this invention to provide a mounting structure for a cathode ray tube.

A further object of the invention is to provide a vibration and shock mounting for cathode ray tubes.

Another object of the invention is to provide a mount having the capability of compensating for the wide tolerance structure inherent in cathode ray tubes.

Another object of the invention is to provide a CRT display package incorporating some of the final electronic drive stages wherein the components are integrated into a dynamically tuned package capable of withstanding a severe shock and vibration environment.

Other objects of the invention will become readily apparent from the following description and accompanying drawings wherein:

FIG. 1 is a view, partially in cross-section, of an embodiment of a cathode ray tube display package incorporating the inventive shock and vibration mounting; and FIG. 2 is a perspective view of an embodiment of a cathode ray tube mount incorporating the invention.

Broadly, the invention is directed to a cathode ray tube display package incorporating some of the final electronic drive stages making it a complete replaceable display package. The package is constructed such that all of the components are mounted and supported so as to form a dynamically tuned package capable of withstanding severe shocks and vibrations. More specifically the package includes a mounting means for the cathode ray tube which includes RFI shielding.

As illustrated in FIG. 1, a cathode ray tube assembly, similar to that illustrated in FIG. 2, is included in a complete display package. The package is self-contained and has only two electrical interfaces with the rest of the system in which it is to be incorporated. The display package of FIG. 1 is a replaceable unit which is subject to further repair and replacement of its subassemblies and components. The CRT assembly is a combination of dynamically tuned mechanical assemblies. The unique feature of this assembly is the strategically selected dynamic response of all components. The replaceable CRT display package as illustrated in FIG. 1 contains the following principal components: cathode ray tube 10, a deflection coil 11, deflection coil yoke or mount 12, yoke attitude adjustment 13, circuit board 14, power transistors 15, drive amplifier heat sink 16, fan or air blower 17, shield 18, potting material 19 such as polyurethane foam, and a retaining bezel 20. This arrangement of components thus provides the following advantages. (1) RFI shielding at the front panel, (2) an adjustable yoke mount allowing three degrees of freedom, (3) a front panel mounting requiring only one rear support, (4) provision for variation in tube profile, (5) vibration and shock mounting for the cathode ray tube, and (6) magnetic shielding for the tube assembly.

One of the primary problems solved by this invention is the wide tolerance structure of the cathode ray tube (CRT) 10. This is accomplished by encapsulating the bell portion 21 of tube 10 in a close tolerance mold. The potting material 19 in this example is an elastomeric compound, such as polyurethane, of a specific density and compressive strength (lbs./percent compression). Through calculation, the correct area and therefore the correct spring rate (K lbs./in.) can be developed to provide the pre-selected natural frequency required. The potting (polyurethane foam) 19 is cast oversize so as to have a slight pre-load when inserted into the shield 18. This pre-load serves to hold the tube 10 physically and also to provide the initial compression required of the tube 10 to achieve the calculated natural frequency in shield 18.

This technique of handling a wide tolerance part can be used in other applications including non-environmental ones. Also, a hard mounting can be provided for the tube 10 by encapsulating the bell 21 of the CRT and using this accurate hard interface for mounting. In addition, with the proper mold, inserts could be potted directly into the assembly to facilitate direct mounting to supporting structure. For shielding, metal spray can be used over the potting material.

The shield 18 is constructed, for example, of spun aluminum and is metal sprayed with a magnetic shielding material. This provides the degree of magnetic attenuation desired. The shield 18 can also be stamped, hydro-formed or welded, depending on the situation and the number of units required. The spun aluminum shield 18 is also provided with a grounded conductive plastic face plate providing RFI shielding for the overall package and also does not break the RFI shielding afforded by the front enclosure panel or bezel 20. The magnetic shielding material can be sprayed on in one, two, three or more layers. Each layer can be a different material depending on the magnetic field intensity and degree of attenuation required.

The retaining ring or bezel 20 functions to completely captivate and cushion the CRT 10 in shield 18 via a plurality of interconnecting means such as screws 22 and nuts 23 (see FIG. 2). As shown in FIG. 1 a gasket 24 is positioned between bezel 20 and a flange 25 of shield 18.

The deflection coil 11 is positioned around the neck 26 of tube 10 and retained by the deflection coil yoke or mount 12 which consists of an adjustable clamp which is lined with a thin layer of elastomer which is approximately 0.015 to 0.030 inch thick. The elastomer holds the deflection coil 11 from turning within the coil yoke 12 when subjected to vibration. Three (3) mounting studs and nuts indicated at 27 (only one shown in FIG. 1) are attached to the rear of the CRT shield structure. The yoke clamp 12 has three (3) ears or lugs 28 by which the yoke is secured to the studs 27, studs 27 and lugs 28 functioning as the yoke attitude adjustment 13. The three studs 27 allow for complete attitude adjustment so as to align the electrical center line of the yoke 12 with the mechanical center line of the CRT 10. The studs 27 are designed to act as cantilevered beams with concentrated loads at the ends. Again this suspension system is of predetermined natural frequency.

Behind the yoke 12 is an enclosure defined by housing 29 for the system electronics, housing 29 being connected to shield 18 via flanges 30 and 31 and bolts 32. The electronic components are mounted in a radial fashion so as to surround the neck 26 of the tube 10 and reduce excessive length. Since this invention is not directed to the electronics of the display package a detailed description thereof is deemed unnecessary. A cap or end cover 33 is attached to housing 29 via bolts 34 to enclose the system electronics.

The fan or air blower 17 provides the cooling air which is ported radially to provide maximum air flow around the main power dissipating components. Turbulent flow is achieved by the high air velocity and obstructions designed in the rear compartment or enclosure.

A unique feature of this CRT display package is that it can be folded apart without breaking a single electrical connection. In the folded out mode, trouble-shooting and repair are greatly aided since the system is operable until main power and stimuli are disconnected.

The embodiment of the invention illustrated in FIG. 2 is of essentially the same structure as that described above with respect to FIG. 1 and like elements will be referenced accordingly. In addition the FIG. 2 embodiment illustrates components not shown in FIG. 1. Shield 18' is constructed in the same manner as set forth above and encloses the cathode ray tube, only the neck 26 thereof being shown, with a layer of potting material such as polyurethane foam therebetween which functions as previously described. Bezel 20 cooperates with a gasket (not shown in FIG. 2) and a flanged ring 35 via screws 22 and nuts 23 to completely captivate and cushion the CRT. The flanged ring 35 may be separated from the flange 25 of shield 18 (see FIG. 1) or connected to shield 18' by welding or other known means. The rear portion of shield 18' as shown in FIG. 2 is provided with a collar or ring 36 instead of the flange 30 as shown in FIG. 1 for interconnection with the electronics section housing, the housing being connected to ring 36 and shield 18' via screws or bolts which cooperate with threaded apertures 37 on ring 36, or nut plates (not shown) riveted directly to the inside of the shield.

The deflection coil 11 and deflection yoke 12 of FIG. 2 are of the same construction as in FIG. 1, the adjustable means for yoke 12 being illustrated by flanges 38 and bolts 39.

Typical leads indicated at 40 and 41, respectively, extend from the neck 26 of the tube and from the deflection coil 11, each being connected to the electronics of the system. An accelerator anode lead 42 for applying an accelerating voltage to the cathode ray tube extends through an aperture 43 in shield 18', the lead being encompassed by suitable potting material 19.

By way of example only, the potting material 19 was constructed of polyurethane foam cast about the tube 10 in an 0.060 inch oversize mold, so that initial compression is required to insert the potted tube into the shield 18. The foam has a compressive strength of about 84 p.s.i. which was calculated to give the tube 10 a natural resonant frequency of 100 c.p.s. while mounted in the shield.

Tests have been conducted to determine the vibration characteristics of the CRT assembly particularly with respect to the magnetic shield, CRT, and the yoke assembly. These tests include two modes of vibration; (1) vibration perpendicular to the axis of the assembly, and (2) vibration parallel to the axis of the assembly. From the results of these tests it was determined that no vibration problems exist with respect to the CRT assembly, constructed in accordance with the invention, as there were no serious resonance points in this exemplary environment beolw 100 c.p.s. The tests thus verified the desired features of the invention.

It has thus been shown that the present invention provides a vibration and shock mounting for cathode ray tubes having a wide tolerance thus overcoming the disadvantages of the prior known mounting means for a CRT.

While specific embodiments of the invention have been illustrated and described, modifications and changes will become apparent to those skilled in the art, and it is intended to cover in the appended claims all such modifications and changes as come within the true spirit and scope of the invention.

What we claim is:

1. A cathode ray tube display package capable of withstanding severe shock and vibration including:
    (a) a cathode ray tube having a bell portion and a neck portion;
    (b) a deflection coil positioned around said neck portion;
    (c) adjustable means for retaining said deflection coil in a desired position with respect to said neck portion of said cathode ray tube, said adjustable retaining means including:
        (1) at least three lug members mounted in axial alignment with said neck portion of said cathode ray tube; and
        (2) at least three stud members adapted to cooperate with said corresponding lug members to provide attitude adjustment to align the electrical center line of said adjustable retaining means with the mechanical center line of said cathode ray tube;
    (d) electronic components positioned around said tube neck portion and operatively connected to said tube and said deflection coil;
    (e) cooling means mounted adjacent said tube neck portion for cooling at least said electronic components, said cooling means including:
        (1) a heat sink positioned around said tube neck portion in close proximity to said electronic components; and
        (2) a fan positioned adjacent said heat sink to provide a cooling air flow around at least said electronic components and said heat sink;
    (f) housing means for enclosing said cathode ray tube, said deflection coil and adjustable retaining means therefor, said heat sink, and said electronic components, said housing means including a portion defining a shield for said bell portion of said cathode ray tube, said shield being separated from said tube bell portion by a shock absorbent pre-loaded potting material, whereby a shock and vibration mounting structure is provided for said cathode ray tube.

2. The display package defined in claim 1, wherein said potting material is an elastomeric compound having a specific density and compressive strength.

3. The display package defined in claim 1, wherein said potting material is composed of polyurethane foam.

4. The display package defined in claim 1, wherein said shield is constructed of spun aluminum with magnetic shielding material applied to at least one surface thereof.

5. The display package in claim 1, wherein said deflection coil adjustable retaining means is lined with a layer of elastomer, whereby said deflection coil is prevented from turning within said adjustable retaining means when subjected to vibration.

6. The display package defined in claim 1, wherein said shield is provided with an aperture adapted to accept an accelerator anode lead for said cathode ray tube, said lead being encompassed by potting material, and wherein said deflection coil and said cathode ray tube are each provided with a plurality of electrical leads.

References Cited

UNITED STATES PATENTS

| | | | |
|---|---|---|---|
| 2,047,020 | 7/1936 | Flaherty | 178—7.8 |
| 2,435,613 | 2/1948 | Sproul | 178—7.8 |
| 2,443,973 | 6/1948 | Asling | 178—7.8 |
| 2,780,803 | 2/1957 | Andrews | 178—7.8 |
| 2,889,477 | 6/1959 | King | 178—7.8 |
| 2,897,487 | 7/1959 | Owen | 178—7.8 |
| 3,013,117 | 12/1961 | Nichol | 178—7.82 |
| 3,299,316 | 1/1967 | Wollrich | 178—7.8 |

ROBERT L. GRIFFIN, *Primary Examiner.*

J. A. ORSINO, *Assistant Examiner.*

Disclaimer 3,400,227.—*William P. Lear*, Wichita, Kans., and *Samuel H. Auld*, Bloomfield Hills, Mich. COMBINED RADIO AND MAGNETIC TAPE PLAYER. Patent dated Sept. 3, 1968. Disclaimer filed Nov. 24, 1971, by the assignee, *Gates Learjet Corporation*.

Hereby disclaims the portion of the term of the patent subsequent to Oct. 31, 1984.

[*Official Gazette January 25, 1972.*]